United States Patent
Nagaosa

(10) Patent No.: US 11,108,073 B2
(45) Date of Patent: Aug. 31, 2021

(54) MANUFACTURING METHOD OF FUEL CELL STACK

(71) Applicant: TOYOTA JIDOSHA KABUSHIKI KAISHA, Toyota (JP)

(72) Inventor: Hideo Nagaosa, Susono (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 76 days.

(21) Appl. No.: 16/267,789

(22) Filed: Feb. 5, 2019

(65) Prior Publication Data
US 2019/0252710 A1 Aug. 15, 2019

(30) Foreign Application Priority Data
Feb. 15, 2018 (JP) .............................. JP2018-024991

(51) Int. Cl.
*H01M 8/2404* (2016.01)

(52) U.S. Cl.
CPC ...... *H01M 8/2404* (2016.02); *H01M 2250/20* (2013.01)

(58) Field of Classification Search
CPC ........................ H01M 8/2404; H01M 2250/20
See application file for complete search history.

(56) References Cited

U.S. PATENT DOCUMENTS

| 2011/0143251 A1* | 6/2011 | Morimoto ......... H01M 8/04313 429/470 |
| 2015/0380761 A1* | 12/2015 | Watanabe ........... H01M 8/2404 29/623.1 |
| 2016/0013508 A1 | 1/2016 | Martinchek et al. |

FOREIGN PATENT DOCUMENTS

| JP | 2005-524214 | 8/2005 |
| JP | 5765252 | 8/2015 |
| JP | 2016-062852 | 4/2016 |
| JP | 6055037 | 12/2016 |

* cited by examiner

*Primary Examiner* — Osei K Amponsah
(74) *Attorney, Agent, or Firm* — Finnegan, Henderson, Farabow, Garrett & Dunner, LLP

(57) ABSTRACT

A manufacturing method of a fuel cell stack includes: stacking fuel cells on a first end plate; superposing a pressure plate, on which protruding portions are provided along an outer periphery thereof, on a stacked body of the fuel cells so that the protruding portions protrude outward from side faces of the stacked body; pressing the protruding portions so that the stacked body is pressed between the first end and the pressure plates; measuring a length of the stacked body in a stacking direction while pressing the protruding portions; superposing on the pressure plate an adjustment plate having a thickness in accordance with the measured length while pressing the protruding portions; and fixing a second end plate to the first end plate so as to sandwich the stacked body, the pressure plate and the adjustment plate between the first and the second end plates while pressing the protruding portions.

6 Claims, 16 Drawing Sheets

MANUFACTURING METHOD OF FUEL CELL STACK

CROSS-REFERENCE TO RELATED APPLICATION

This application is based upon and claims the benefit of priority of the prior Japanese Patent Application No. 2018-024991, filed on Feb. 15, 2018, the entire contents of which are incorporated herein by reference.

TECHNICAL FIELD

The present disclosure relates to a manufacturing method of a fuel cell stack.

BACKGROUND

In the manufacture of a fuel cell stack, a cell stacked body in which a plurality of fuel cells (i.e., unit cells) are stacked is sandwiched between a pair of end plates. The thickness of each fuel cell has a variation due to an error of the thickness of a gas diffusion layer in a Membrane Electrode Gas diffusion layer Assembly (MEGA), for example.

Therefore, a shim plate with an appropriate thickness (i.e., a shim member) is provided between the pair of end plates so that the variation in the length of the fuel cell stack in a stacking direction is reduced. For example, Patent Document 1 (i.e., Japanese Unexamined Patent Application Publication No. 2016-62852) discloses that the end plates are fastened once in a stage where only a half of the fuel cells are stacked, the length of the half of the fuel cells is measured at that stage, the length of the cell stacked body is estimated from the measured value, and the thickness of the shim member is determined according to the estimated value.

However, according to the technology of the Patent Document 1, since it is necessary to release the fastening between the end plates in order to stack the remaining fuel cells after measuring the length of the fuel cell at the stage of stacking only the half of the fuel cells, it takes a long time to manufacture the fuel cell stack.

SUMMARY

It is an object of the present disclosure to provide a manufacturing method of the fuel cell stack that can reduce the time required for manufacturing.

The above object is achieved by a manufacturing method of a fuel cell stack including: stacking a plurality of fuel cells on a first end plate; superposing a pressure plate, on which a plurality of protruding portions are provided along an outer periphery thereof, on a stacked body of the fuel cells so that the protruding portions protrude outward from side faces of the stacked body; pressing the protruding portions so that the stacked body is pressed between the first end plate and the pressure plate; measuring a length of the stacked body in a stacking direction while pressing the protruding portions; superposing, on the pressure plate, an adjustment plate having a thickness in accordance with the measured length while pressing the protruding portions; and fixing a second end plate to the first end plate so as to sandwich the stacked body, the pressure plate and the adjustment plate between the first end plate and the second end plate while pressing the protruding portions.

In the above-mentioned manufacturing method, the pressing the protruding portions may include: engaging a plurality of arms with the protruding portions, respectively, the arms extending along the stacking direction from a first end plate side; and moving the arms along the stacking direction to the first end plate side.

In the above-mentioned manufacturing method, the fixing the second end plate to the first end plate may include: arranging each of a plurality of fixing members extending in the stacking direction between the protruding portions; and connecting the second end plate to the first end plate via the fixing members.

In the above-mentioned manufacturing method, the superposing the adjustment plate on the pressure plate may include: selecting the adjustment plate having the thickness in accordance with the measured length from a plurality of plates having respective different thicknesses; and superposing the selected adjustment plate on the pressure plate.

Another manufacturing method of a fuel cell stack disclosed herein includes: stacking a plurality of fuel cells on a first end plate; superposing a pressure plate on a stacked body of the fuel cells; pressing a plurality of edge portions of the pressure plate so that the stacked body is pressed between the first end plate and the pressure plate; measuring a length of the stacked body in a stacking direction while pressing the edge portions; superposing, on the pressure plate, an adjustment plate having a plurality of cutouts and a thickness in accordance with the measured length so that the cutouts match the edge portions, respectively, while pressing the edge portions; and fixing a second end plate to the first end plate so as to sandwich the stacked body, the pressure plate and the adjustment plate between the first end plate and the second end plate while pressing the edge portions.

In the above-mentioned manufacturing method, the fixing the second end plate to the first end plate includes superposing the second end plate on the adjustment plate so that a plurality of recessed portions provided along an outer periphery of the second end plate match the cutouts, respectively.

In the above-mentioned manufacturing method, the pressing the edge portions may include: engaging a plurality of arms with the edge portions, respectively, the arms extending along the stacking direction from a first end plate side; and moving the arms along the stacking direction to the first end plate side.

In the above-mentioned manufacturing method, the superposing the adjustment plate on the pressure plate may include: selecting the adjustment plate having the thickness in accordance with the measured length from a plurality of plates having respective different thicknesses; and superposing the selected adjustment plate on the pressure plate.

DETAILED DESCRIPTION

First Embodiment

Figure 1:
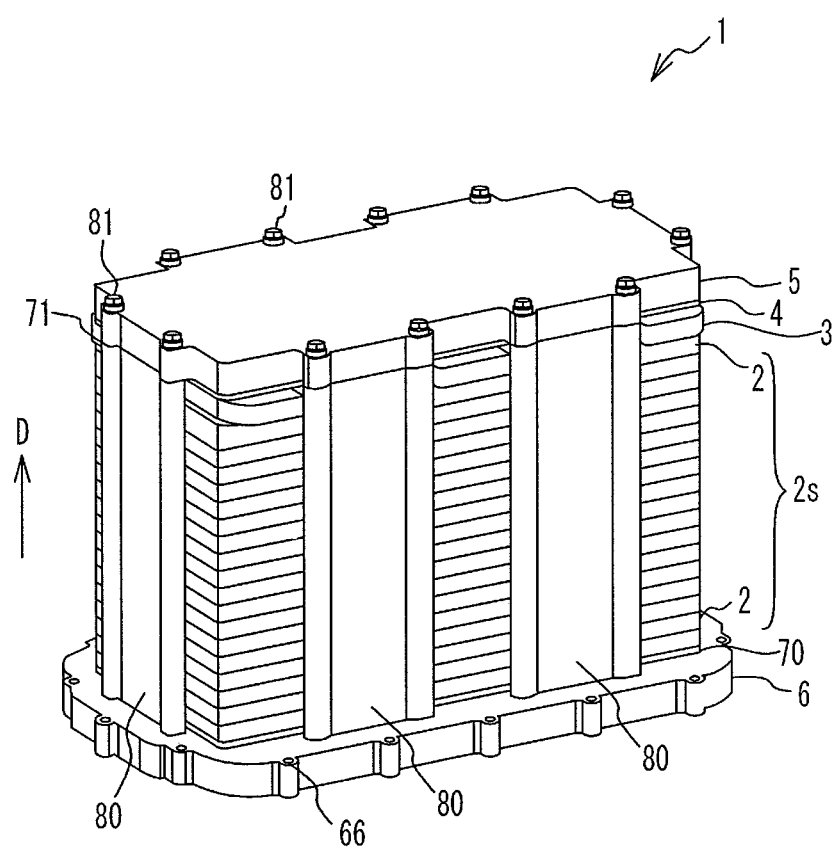
FIG. 1 is a perspective view illustrating an example of a fuel cell stack manufactured according to a manufacturing method of a first embodiment.

FIG. 1 is a perspective view illustrating an example of a fuel cell stack 1 manufactured according to a manufacturing method of a first embodiment. In FIG. 1, an upper part of a sheet is defined as a vertical upward direction, and a lower part of the sheet is defined as a vertical downward direction.

The fuel cell stack 1 generates electricity by conducting an electrochemical reaction of a fuel gas such as a hydrogen gas and an oxidant gas such as an air. The fuel cell stack 1 is mounted on a fuel cell vehicle, for example, and supplies an electric power for driving a motor thereof. The application of the fuel cell stack 1 is not limited to a vehicle such as the fuel cell vehicle, and the fuel cell stack 1 is also used for other devices that require the electric power.

The fuel cell stack 1 includes: a plurality of fuel cells 2 as unit cells; a pressure plate 3; a shim plate 4 that is an example of an adjustment plate; a lower end plate 6 that is an example of a first end plate; an upper end plate 5 that is an example of a second end plate; insulating plates 70 and 71; and a plurality of fastening bars 80 that are examples of a plurality of fixing members. The plurality of fuel cells 2 are stacked in a stacking direction D, and constitute a cell stacked body 2s. The cell stacked body 2s is an example of the stacked body.

The insulating plate 70, the cell stacked body 2s, the insulating plate 71, the pressure plate 3 and the shim plate 4 are stacked in this order on the lower end plate 6. The upper end plate 5 is fastened to the lower end plate 6 via the fastening bars 80 extending in the stacking direction D in side faces of the cell stacked body 2s. At this time, the upper end plate 5 is fastened to the fastening bars 80 by bolts 81 at plural locations along the outer periphery of the upper end plate 5, and the lower end plate 6 is also fastened to the fastening bars 80 by bolts (not illustrated) in the same manner as the upper end plate 5.

Thereby, the upper end plate 5 is fixed to the lower end plate 6. The insulating plate 70, the cell stacked body 2s, the pressure plate 3, the shim plate 4 and the insulating plate 71 are sandwiched between the upper end plate 5 and the lower end plate 6.

Moreover, the upper end plate 5, the insulating plate 70, the cell stacked body 2s, the pressure plate 3, the shim plate 4 and the insulating plate 71 are covered with a cover member, not illustrated. Screw holes 66 for fastening the cover member along the outer periphery of the lower end plate 6 are provided on the lower end plate 6.

Although an illustration is omitted in FIG. 1, an anode inlet manifold, an anode outlet manifold, a cathode inlet manifold, a cathode outlet manifold, a cooling medium inlet manifold and a cooling medium outlet manifold that penetrate through the insulating plate 70, the cell stacked body 2s and the lower end plate 6 are provided in the fuel cell stack 1.

The fuel gas is supplied to each fuel cell 2 from the anode inlet manifold and is used for power generation. A fuel off-gas passes through the anode outlet manifold from each fuel cell 2 and is discharged to the outside of the fuel cell stack 1.

The oxidant gas is supplied to each fuel cell 2 from the cathode inlet manifold and is used for power generation. An oxidant off-gas passes through the cathode outlet manifold from each fuel cell 2 and is discharged to the outside of the fuel cell stack 1.

The cooling medium such as water is supplied to each fuel cell 2 from the cooling medium inlet manifold and is used for cooling. Used cooling medium passes through the cooling medium outlet manifold from each fuel cell 2 and is discharged to the outside of the fuel cell stack 1.

Figure 2A:
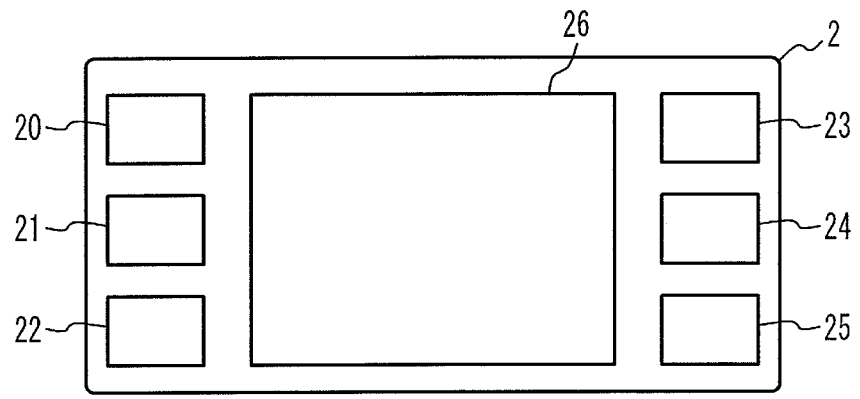
FIG. 2A is a plan view illustrating an example of a fuel cell.
Figure 2B:
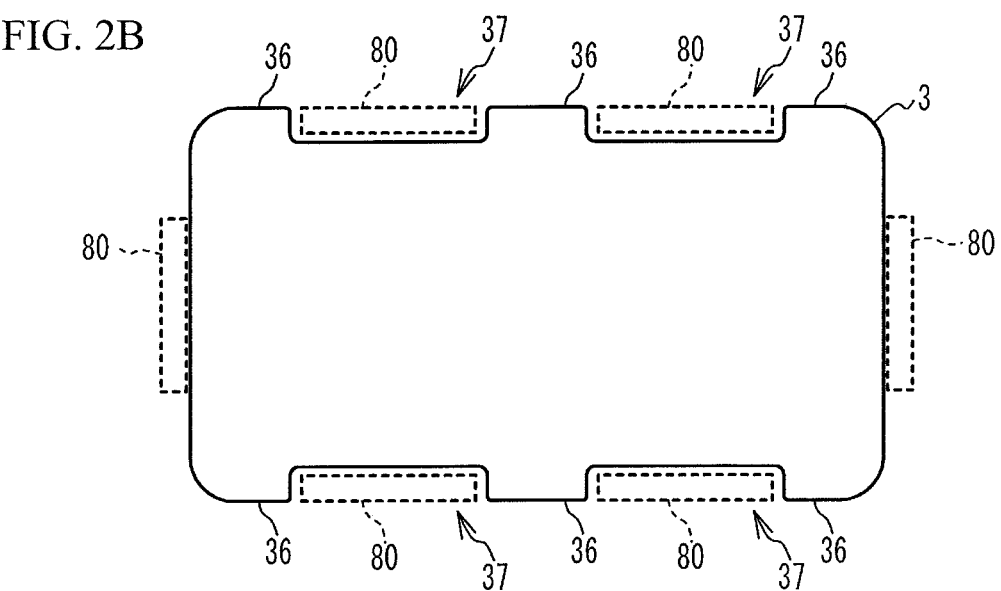
FIG. 2B is a plan view illustrating an example of a pressure plate.
Figure 2C:
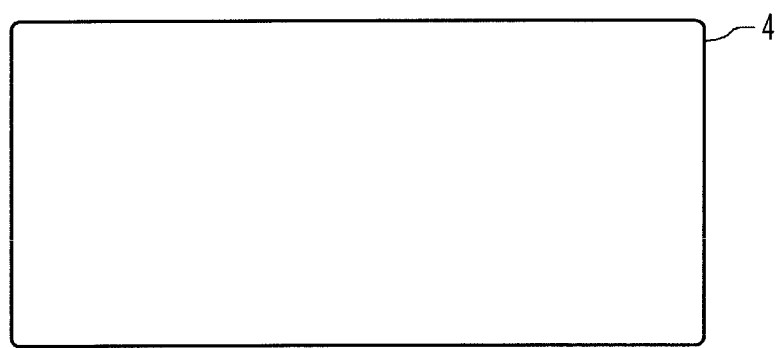
FIG. 2C is a plan view illustrating an example of a shim plate.

FIG. 2A is a plan view illustrating an example of the fuel cell 2, FIG. 2B is a plan view illustrating an example of the pressure plate 3, and FIG. 2C is a plan view illustrating an example of the shim plate 4. FIGS. 2A to 2C illustrate the shapes of the fuel cell 2, the pressure plate 3 and the shim plate 4, respectively, when they are viewed from above in the stacking direction D.

The fuel cell 2 performs the power generation by using the fuel gas and the oxidant gas supplied from the outside of the fuel cell stack 1. The fuel cell 2 has a substantially rectangular shape, and openings 20 to 25 and a power generation region 26 are provided in the fuel cell 2. The openings 20 to 25 are parts of the anode inlet manifold, the cooling medium outlet manifold, the cathode outlet manifold, the cathode inlet manifold, the cooling medium inlet manifold, and the anode outlet manifold, respectively. The opening 20 to 22 and the opening 23 to 25 are provided side by side at ends opposite to each other across the power generation region 26.

The fuel cell 2 has a pair of separators, not illustrated, made of a metal plate, for example, and the Membrane-electrode-gas diffusion layer Assembly (MEGA), not illustrated, sandwiched between the separators. The power generation region 26 is an effective region where the MEGA performs the power generation.

The pressure plate 3 has a substantially rectangular shape, and presses the cell stacked body 2s toward the lower end plate 6 by being pressed during the manufacture of the fuel cell stack 1. Therefore, the pressure plate 3 has a rigidity, and the thickness of the pressure plate 3 in the stacking direction D is greater than those of the fuel cell 2 and the shim plate 4.

In addition, a plurality of protruding portions 36 are provided along the outer periphery of the pressure plate 3. Each protruding portion 36 protrudes outward from the side face of the pressure plate 3. During the manufacture of the fuel cell stack 1, an arm for pressing is engaged with each protruding portion 36.

The same number of protruding portions 36 as each other are provided at the same positions of the opposing sides, respectively. Therefore, it is possible to maintain the pressure plate 3 suitably horizontally at the time of pressing, and the arrangement pattern and the number of the protruding portions 36 have no limitation.

A space 37 is present between the protruding portions 36 adjacent to each other. In the fuel cell stack 1, the fastening bar 80 is arranged in the space 37, as indicated by a dotted line. Thus, since the space 37 between the protruding portions 36 is effectively used, the enlargement of the fuel cell stack 1 is suppressed.

The size of the pressure plate 3 is substantially equal to that of each fuel cell 2 except for each protruding portion 36. In the fuel cell stack 1, a region of the pressure plate 3 excluding the protruding portions 36 is superposed on the fuel cell 2.

The shim plate 4 has a substantially rectangular shape, and has an appropriate thickness in order to adjust the height in the stacking direction D of the fuel cell stack 1. There are a plurality of types of the shim plates 4 that differ from each other in thickness. In the manufacture of the fuel cell stack 1, the shim plate 4 with the appropriate thickness is selected according to the length in the stacking direction D of the cell stacked body 2s at the time of pressing the pressure plate 3.

The size of the shim plate 4 is substantially equal to that of the pressure plate 3 excluding each protruding portion 36. In the fuel cell stack 1, the shim plate 4 is superposed on a region of the pressure plate 3 excluding each protruding portion 36. The shim plate 4 has a less rigidity than the pressure plate 3.

Figure 3A:
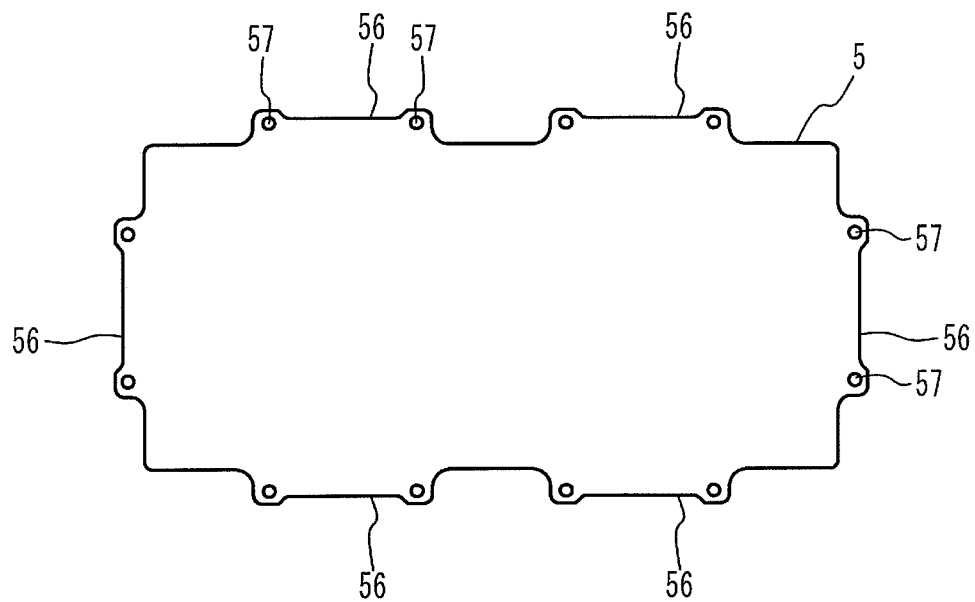
FIG. 3A is a plan view illustrating an example of an upper end plate.
Figure 3B:
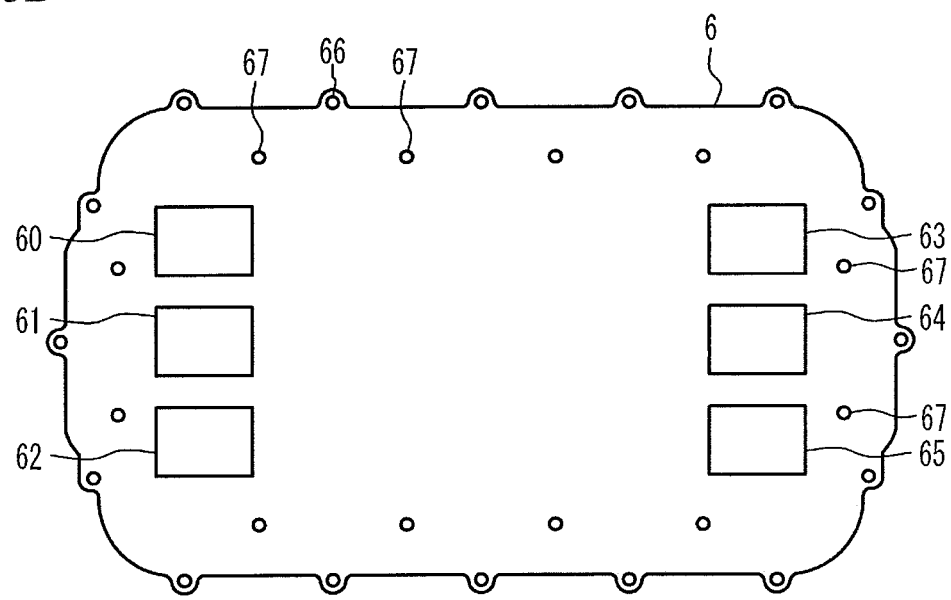
FIG. 3B is a plan view illustrating an example of a lower end plate.

FIG. 3A is a plan view illustrating an example of the upper end plate 5, and FIG. 3B is a plan view illustrating an example of the lower end plate 6. FIGS. 3A and 3B illustrate the shapes of the upper end plate 5 and the lower end plate 6, respectively, when they are viewed from above in the stacking direction D.

The upper end plate 5 has a substantially rectangular shape, and a plurality of projecting portions 56 are provided along the outer periphery of the upper end plate 5. Each projecting portion 56 is provided at a position that does not overlap each protruding portion 36 of the pressure plate 3. Each projecting portion 56 projects outward, and has a pair of screw holes 57. The bolt 81 is screwed into each screw hole 57 to fasten the upper end plate 5 to the fastening bar 80.

The lower end plate 6 has a substantially rectangular shape, and a plurality of screw holes 66 are provided along the outer periphery of the lower end plate 6. Moreover, each screw hole 67 is provided on the lower end plate 6 at a position overlapping each screw hole 57 of the upper end plate 5. The bolt 81 is screwed into each screw hole 67 to fasten the lower end plate 6 to the fastening bar 80.

Moreover, openings 60 to 65 are provided in the lower end plate 6. The openings 60 to 65 are parts of the anode inlet manifold, the cooling medium outlet manifold, the cathode outlet manifold, the cathode inlet manifold, the cooling medium inlet manifold, and the anode outlet manifold, respectively. The opening 60 to 62 and the opening 63 to 65 are provided side by side at ends opposite to each other.

Since the upper end plate 5 and the lower end plate 6 have high rigidities, they can stably sandwich the insulating plate 70, the cell stacked body 2s, the pressure plate 3, the shim plate 4 and the insulating plate 71.

Next, a description will be given of a manufacturing method of the fuel cell stack 1. In the following description, FIGS. 5 to 8 are referred to along with FIG. 4.

Figure 4:
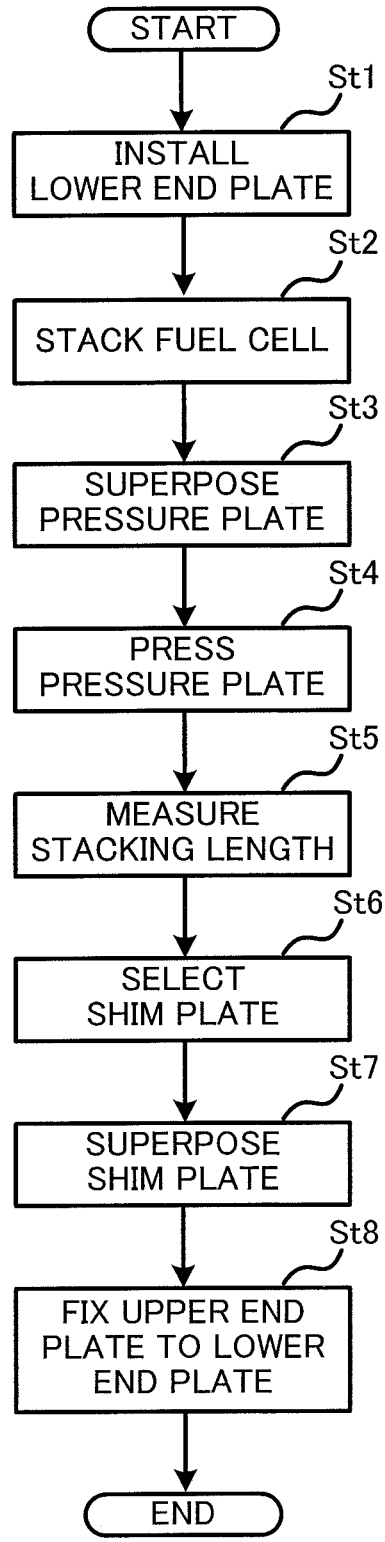
FIG. 4 is a flowchart illustrating an example of a manufacturing step of the fuel cell stack.

FIG. 4 is a flowchart illustrating an example of a manufacturing step of the fuel cell stack 1. In the manufacture of the fuel cell stack 1, the fuel cell 2, the pressure plate 3, the shim plate 4, the lower end plate 6, the upper end plate 5, the insulating plates 70 and 71, the fastening bars 80 and the like are prepared in advance.

Figure 5:
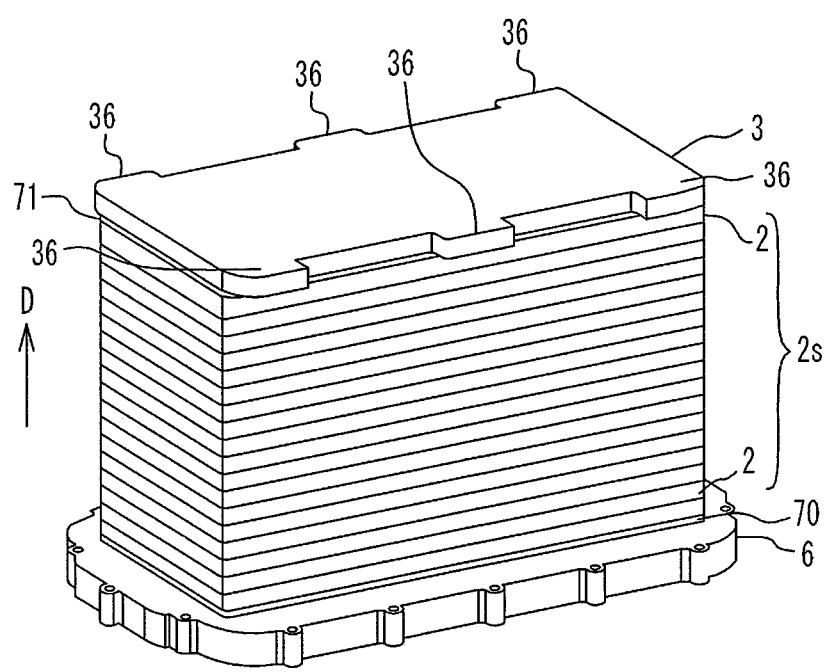
FIG. 5 is a perspective view illustrating an example of a step of stacking a cell stacked body and the pressure plate on the lower end plate.

FIG. 5 is a perspective view illustrating an example of a step of stacking the cell stacked body 2s and the pressure plate 3 on the lower end plate 6. In FIG. 5, component parts identical to those of FIGS. 1 to 3 are designated by identical reference numerals, and a description thereof is omitted.

The lower end plate 6 is installed on an assembly table, not illustrated (step SU). Next, the plurality of fuel cells 2 are stacked on the lower end plate 6 via the insulating plate 70 (step St2). Thereby, the cell stacked body 2s is arranged on the lower end plate 6.

Next, the pressure plate 3 is superposed on the cell stacked body 2s (step St3). In this case, the pressure plate 3 is superposed on the cell stacked body 2s so that each protruding portion 36 protrudes horizontally outward from the side faces of the cell stacked body 2s in a front view. Thereby, the pressure plate 3 is arranged in a state where each protruding portion 36 protrudes from the cell stacked body 2s. Next, the pressure plate 3 is pressed (step St4). Here, the insulating plate 71 is arranged between the pressure plate 3 and the cell stacked body 2s.

Figure 6:
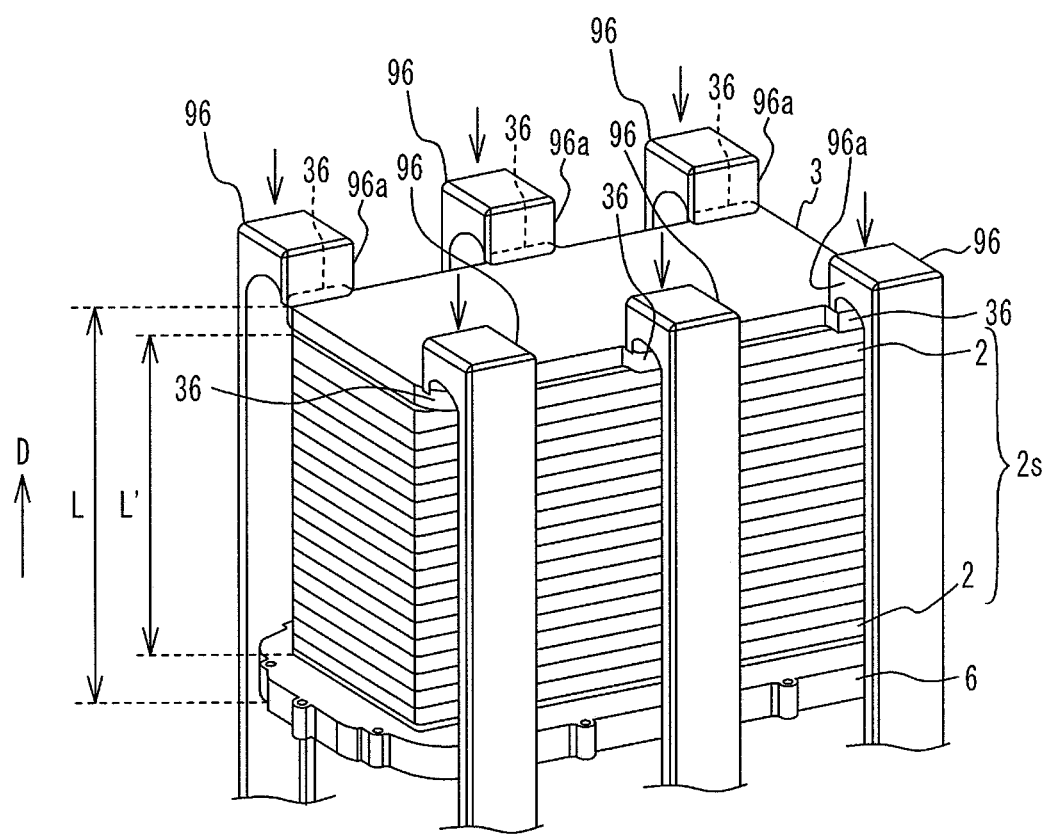
FIG. 6 is a perspective view illustrating an example of a step of pressing the pressure plate.

FIG. 6 is a perspective view illustrating an example of a step of pressing the pressure plate 3. In FIG. 6, component parts identical to those of FIGS. 1 to 3 and 5 are designated by identical reference numerals, and a description thereof is omitted.

The pressure plate 3 is pressed downward, as indicated by arrows, by a plurality of arms 96 extending along the stacking direction D from a lower end plate 6 side. Thereby, the cell stacked body 2s is pressed between the lower end plate 6 and the pressure plate 3.

In this case, since each protruding portion 36 protrudes outward from the side faces of the cell stacked body 2s, the whole planar region of the pressure plate 3 excluding the protruding portion 36 can press the cell stacked body 2s. Then, since each arm 96 presses the protruding portion 36, a region for superposing the shim plate 4 on an upper surface of the pressure plate 3 is ensured. That is, when the shim plate 4 is superposed on the pressure plate 3 from above, each arm 96 does not hinder the superposing.

Each arm 96 is engaged with the protruding portion 36, and moves to the lower end plate 6 side along the stacking direction D to press the protruding portion 36. More specifically, a claw portion 96a is provided at the tip of each arm 96, and is engaged with the protruding portion 36. Therefore, it is possible to press the pressure plate 3 from a lower side where the assembly table is located.

Next, while each protruding portion 36 is pressed, a stacking length L is measured (step St5). The stacking length L is a length from a lower end of the lower end plate 6 to an upper end of the pressure plate 3. A measuring means of the stacking length L includes, for example, an optical sensor and the like, but is not limited thereto. In this step, when each thickness of the lower end plate 6 and the pressure plate 3 is constant, a length L' of the cell stacked body 2s in the stacking direction D is calculated from the stacking length L, so that the length L' of the cell stacked body 2s can be measured.

Next, the shim plate 4 with a thickness corresponding to the measured stacking length L or the length L' of the cell stacked body 2s is selected from the plurality of shim plates 4 with respective different thicknesses (step St6). More specifically, the shim plate 4 with an appropriate thickness is selected so that the length of the fuel cell stack 1 in the stacking direction is a predetermined value. Thus, by preparing the plurality of shim plates 4 with respective different thicknesses in advance, it is possible to quickly prepare the shim plate 4 with the appropriate thickness. Next, the selected shim plate 4 is superposed on the pressure plate 3 (step St7).

Figure 7:
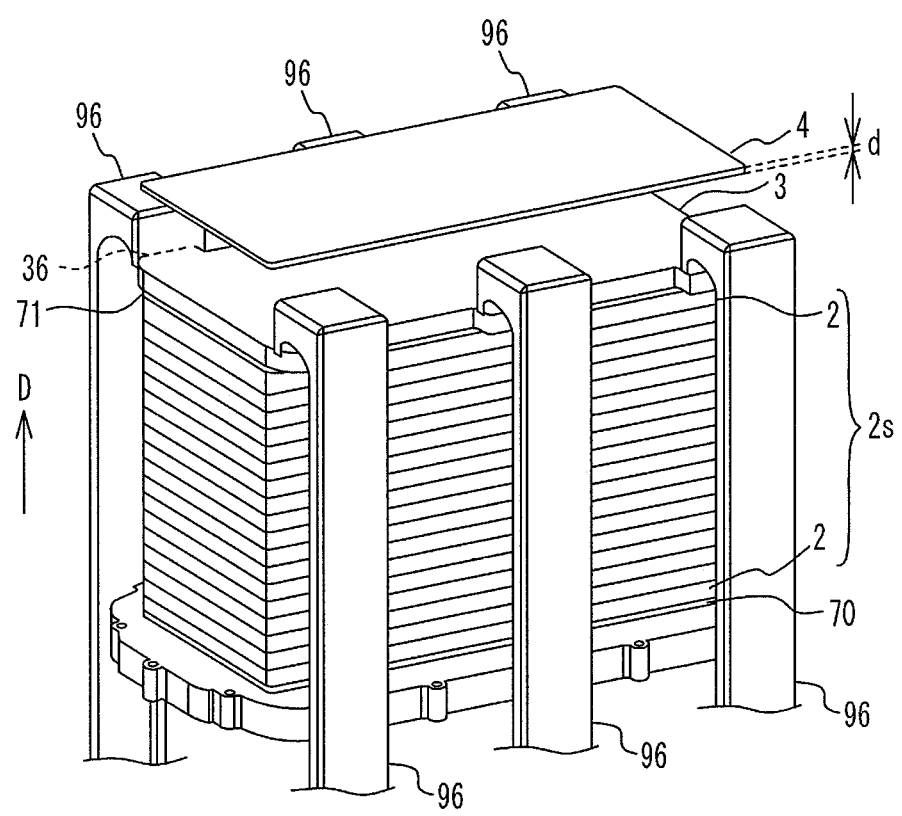
FIG. 7 is a perspective view illustrating an example of a step of superposing the shim plate on the pressure plate.

FIG. 7 is a perspective view illustrating an example of a step of superposing the shim plate 4 on the pressure plate 3. In FIG. 7, component parts identical to those of FIGS. 1 to 3, 5 and 6 are designated by identical reference numerals, and a description thereof is omitted.

This step is performed while each protruding portion 36 is pressed. The shim plate 4 has a thickness d corresponding to the measured stacking length L or the length L' of the cell stacked body 2s in the stacking direction D. Therefore, variation in the length of the fuel cell stack 1 is reduced.

Here, since each protruding portion 36 is provided along the outer periphery of the pressure plate 3, there is no hindrance in the arrangement of the shim plate 4 in the region of the pressure plate 3 on which the shim plate 4 is superposed. Therefore, while the pressure plate 3 is pressed, it is possible to superpose the shim plate 4 on the pressure plate 3 from above. Next, the upper end plate 5 is fixed to the lower end plate 6 (step St8).

Figure 8:
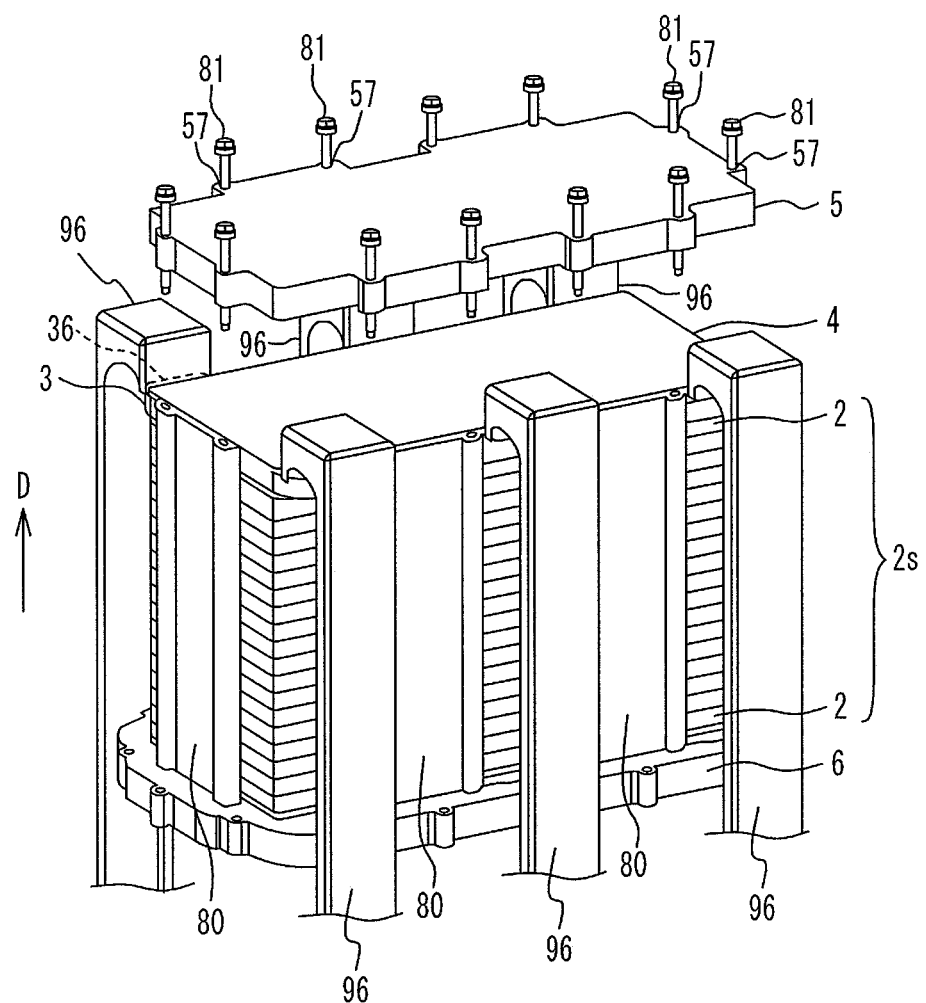
FIG. 8 is a perspective view illustrating an example of a step of fixing the upper end plate to the lower end plate.

FIG. 8 is a perspective view illustrating an example of a step of fixing the upper end plate 5 to the lower end plate 6. In FIG. 8, component parts identical to those of FIGS. 1 to 3 and 5 to 7 are designated by identical reference numerals, and a description thereof is omitted.

This step is performed while each protruding portion 36 is pressed. The upper end plate 5 is superposed on the shim plate 4 from above, and is fixed to the fastening bars 80 by being connected to them by the bolts 81. Thereby, the upper end plate 5 and the lower end plate 6 sandwich the cell stacked body 2s, the pressure plate 3 and the shim plate 4.

Since each protruding portion 36 is provided along the outer periphery of the pressure plate 3, it protrudes outward from the shim plate 4. Therefore, there is no hindrance in the arrangement of the upper end plate 5 in the region of the shim plate 4 on which the upper end plate 5 is superposed. Accordingly, while the pressure plate 3 is pressed, the upper end plate 5 can be superposed on the shim plate 4 from above and fixed to the lower end plate 6.

Moreover, the upper end plate 5 is fixed to the lower end plate 6 by being connected to the lower end plate 6 via the fastening bars 80. In this case, since each fastening bar 80 is arranged between the protruding portions 36, the space 37 between the protruding portions 36 is effectively used as described in reference to FIG. 2, and the enlargement of the fuel cell stack 1 is suppressed.

In this way, the manufacturing method of the fuel cell stack 1 is performed. In the manufacturing method of the present embodiment, the length L' of the cell stacked body 2s is measured while each protruding portion 36 of the pressure plate 3 is pressed. Therefore, it is possible to measure the length L' of the cell stacked body 2s pressed between the lower end plate 6 and the pressure plate 3, and the shim plate 4 with the appropriate thickness d in accordance with the length L' can be used.

Moreover, the step of superposing the shim plate 4 on the pressure plate 3 and the step of fixing the upper end plate 5 to the lower end plate 6 are performed while each protruding portion 36 is pressed. Since each protruding portion 36 is provided along the outer periphery of the pressure plate 3 and protrudes horizontally outward from the side face of the cell stacked body 2s in the front view, there is no hindrance in the case of arranging the shim plate 4 and the upper end plate 5 from above in each step mentioned above.

Therefore, according to the manufacturing method of the present embodiment, it is possible to arrange the shim plate 4 and the upper end plate 5 while the cell stacked body 2s is pressed, and further there is no need to fasten or release the upper end plate 5 in the middle of the manufacturing step, unlike the above-mentioned Patent Document 1. Thus, according to the manufacturing method of the present embodiment, the time required for the manufacture of the fuel cell stack 1 is shortened.

Figure 9:
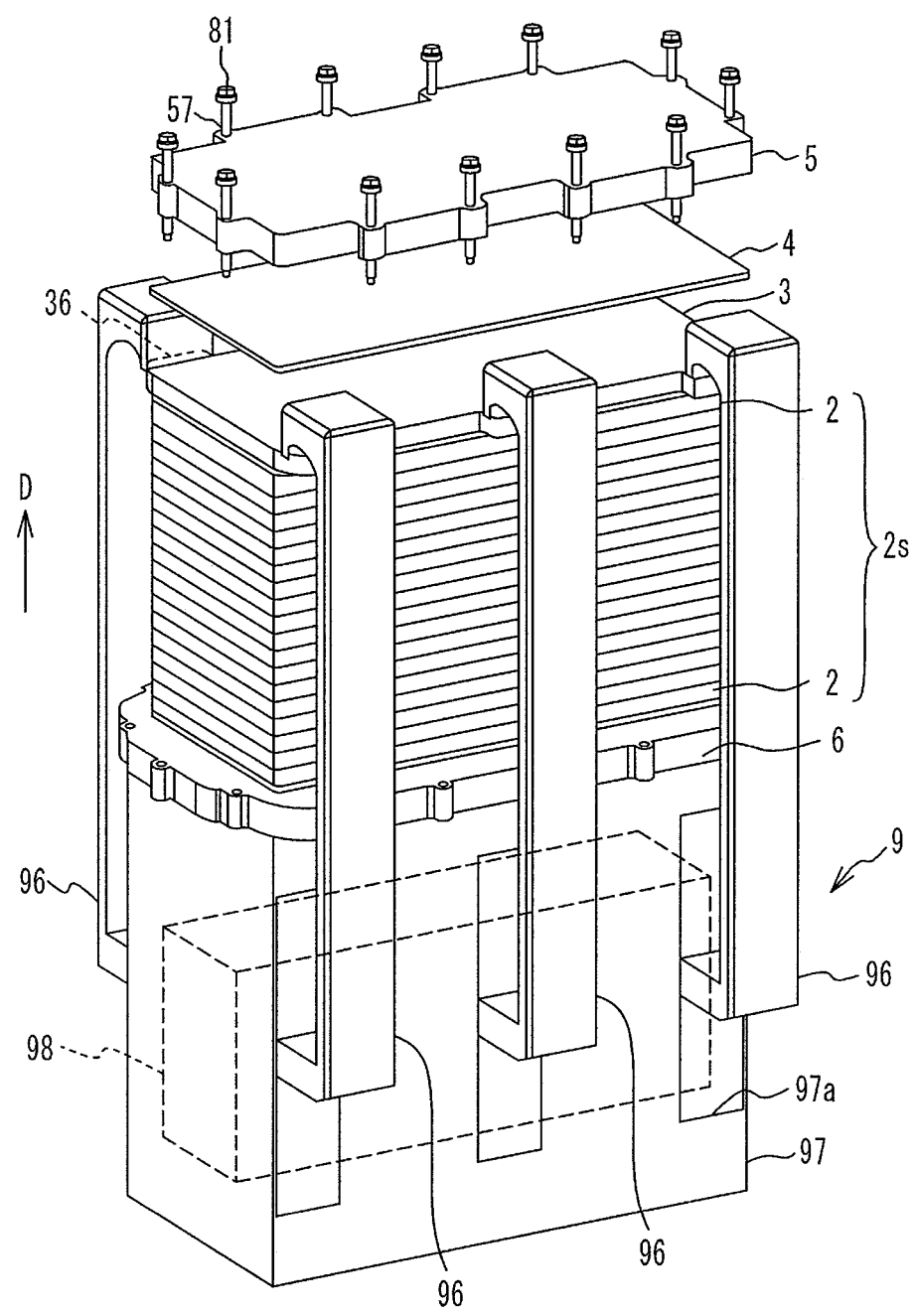
FIG. 9 is a perspective view illustrating an example of a manufacturing device of the fuel cell stack.

FIG. 9 is a perspective view illustrating an example of a manufacturing device 9 of the fuel cell stack 1. In FIG. 9, component parts identical to those of FIGS. 1 to 3 and 5 to 8 are designated by identical reference numerals, and a description thereof is omitted. Here, FIG. 9 illustrates a state where the shim plate 4 and the upper end plate 5 are superposed on the pressure plate 3 from above while each arm 96 presses the protruding portion 36.

The manufacturing device 9 includes the plurality of arms 96, an assembly table 97 and an arm driving device 98. The assembly table 97 has a substantially rectangular parallelepiped shape as an example. The lower end plate 6, the insulating plate 70, the cell stacked body 2s, the insulating plate 71 and the pressure plate 3 are placed on an upper surface of the assembly table 97 in a state where they are stacked.

For example, the arm driving device 98 having a motor or the like is provided inside the assembly table 97. The arm driving device 98 is a driving source of each arm 96, and is connected to each arm 96 through an opening 97a of the side face of the assembly table 97. The arm driving device 98 moves each arm 96 downward. Thereby, each protruding portion 36 of the pressure plate 3 is pressed.

Since the arm driving device 98 is located below the lower end plate 6, the insulating plate 70, the cell stacked body 2s, the insulating plate 71 and the pressure plate 3, there is no hindrance in the case of superposing the shim plate 4 and the upper end plate 5 on the pressure plate 3. Therefore, the manufacture of the fuel cell stack 1 is facilitated.

Second Embodiment

Figure 10:
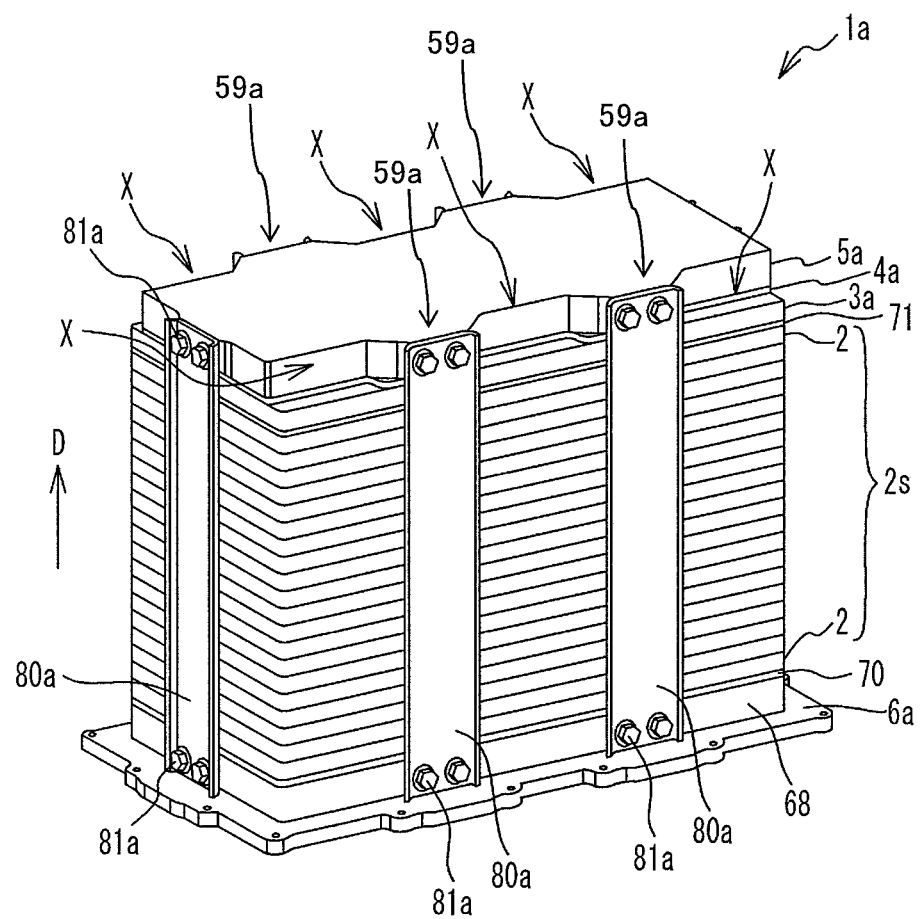
FIG. 10 is a perspective view illustrating an example of a fuel cell stack manufactured according to a manufacturing method of a second embodiment.

FIG. 10 is a perspective view illustrating an example of a fuel cell stack 1a manufactured according to a manufacturing method of a second embodiment. In FIG. 10, an upper part of the sheet is defined as a vertical upward direction, and a lower part of the sheet is defined as a vertical downward direction. In FIG. 10, component parts identical to those of FIG. 1 are designated by identical reference numerals, and a description thereof is omitted.

The fuel cell stack 1a includes: the cell stacked body 2s; a pressure plate 3a; a shim plate 4a that is an example of the adjustment plate; a lower end plate 6a that is an example of the first end plate; an upper end plate 5a that is an example of the second end plate; the insulating plates 70 and 71; and a plurality of fastening bars 80a that are an example of the plurality of fixing members.

The protruding portion 36 is not provided in the pressure plate 3a of the present embodiment. Each of outer peripheral portions of the upper end plate 5a and the shim plate 4a has a plurality of retracted shapes for not inhibiting the pressing of the arms 96, as indicated by codes X. Therefore, it is possible to superpose the upper end plate 5a and the shim plate 4a on the pressure plate 3a from above while the pressure plate 3a is pressed as is the case with the first embodiment.

A thick wall portion 68 having a larger thickness than an outer peripheral portion of the lower end plate 6a is provided on the lower end plate 6a. The fastening bars 80a are fastened by bolts 81a to the thick wall portion 68 and unretracted portions (conversely, projecting portions 59a) of an outer peripheral surface of the upper end plate 5a.

Figure 11A:
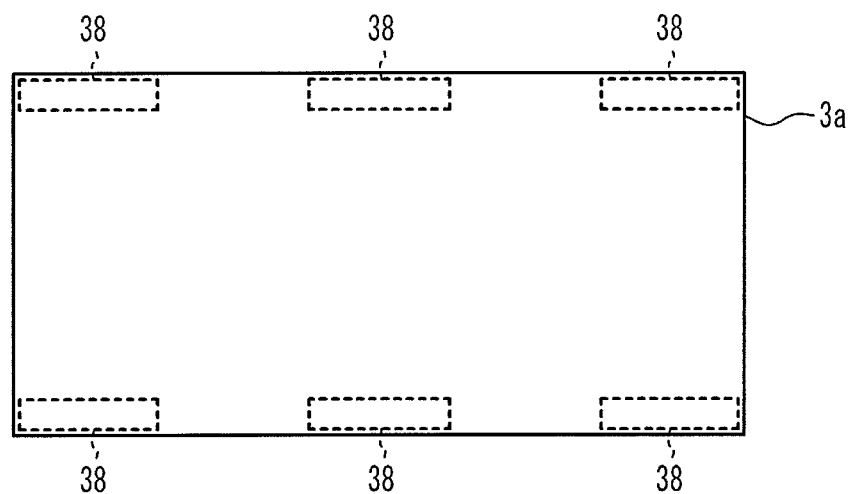
FIG. 11A is a plan view illustrating an example of a pressure plate.
Figure 11B:
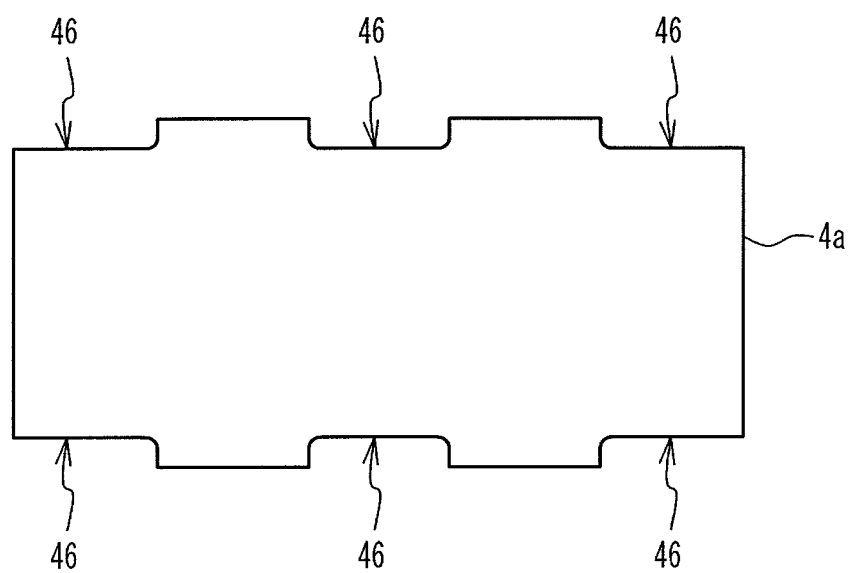
FIG. 11B is a plan view illustrating an example of a shim plate.

FIG. 11A is a plan view illustrating an example of the pressure plate 3a, and FIG. 11B is a plan view illustrating an example of the shim plate 4a. FIGS. 11A and 11B illustrate the shapes of the pressure plate 3a and the shim plate 4a, respectively, when they are viewed from above in the stacking direction D. In FIGS. 11A and 11B, component parts identical to those of FIG. 2A to 2C are designated by identical reference numerals, and a description thereof is omitted.

The pressure plate 3a differs from the pressure plate 3 of the first embodiment in that the protruding portions 36 are not provided. Therefore, a plurality of edge portions 38 of the pressure plate 3a are pressed by the arms 96.

The shim plate 4a differs in including a plurality of cutouts 46 from the shim plate 4 of the first embodiment. When the shim plate 4a is superposed on the pressure plate 3a, a position of each cutout 46 matches a position of the edge portion 38 where the arm 96 presses.

Figure 12A:
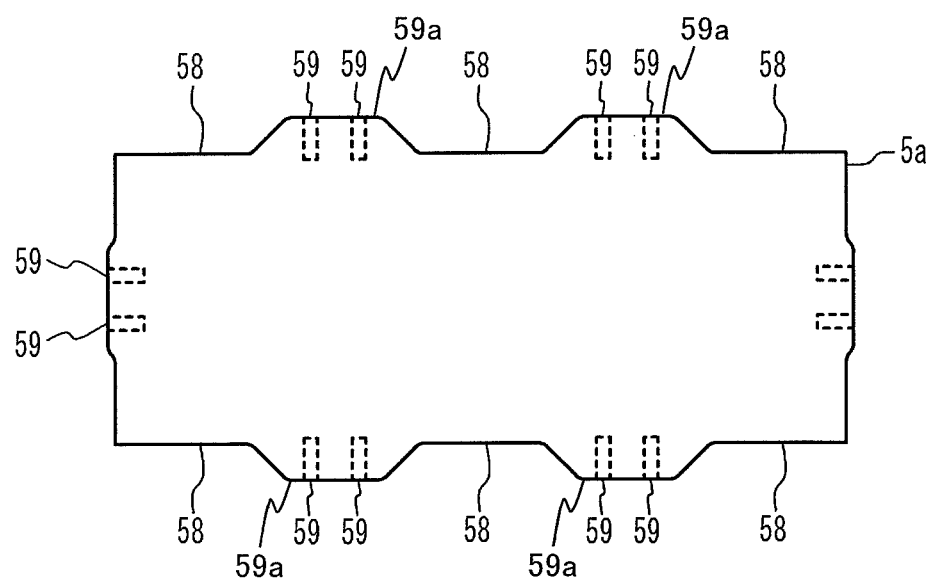
FIG. 12A is a plan view illustrating an example of an upper end plate.
Figure 12B:
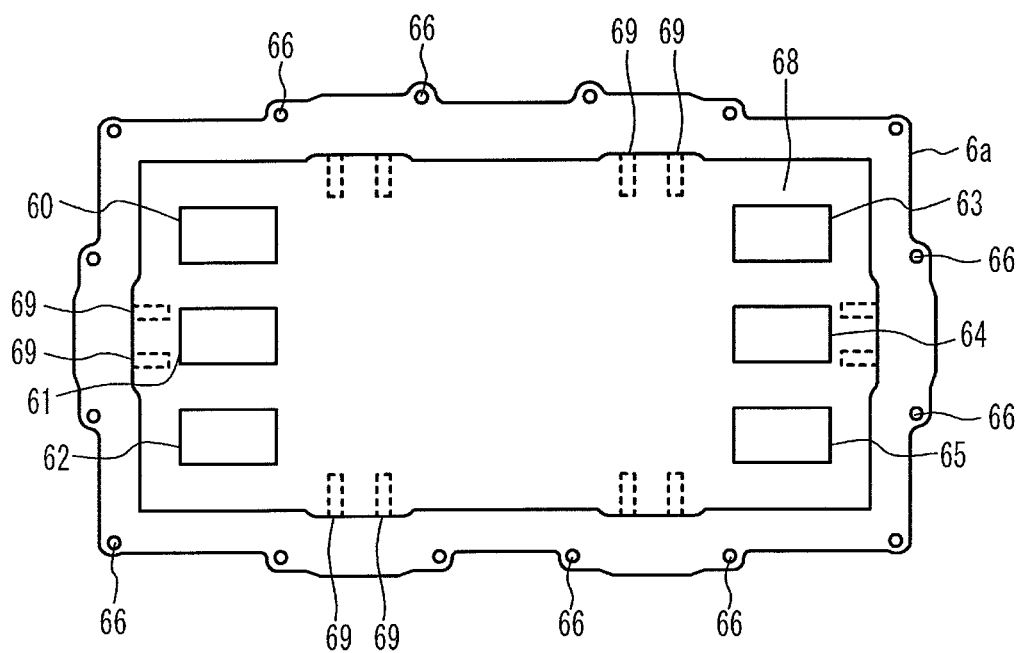
FIG. 12B is a plan view illustrating an example of a lower end plate.

FIG. 12A is a plan view illustrating an example of the upper end plate 5a, and FIG. 12B is a plan view illustrating an example of the lower end plate 6a. FIGS. 12A and 12B illustrate the shapes of the upper end plate 5a and the lower end plate 6a, respectively, when they are viewed from above in the stacking direction D. In FIGS. 12A and 12B, component parts identical to those of FIGS. 3A and 3B are designated by identical reference numerals, and a description thereof is omitted.

The upper end plate 5a differs from the upper end plate 5 of the first embodiment in that a plurality of recessed portions 58 are provided along the outer periphery of the upper end plate 5a. When the upper end plate 5a is superposed on the shim plate 4a, a position of each recessed portion 58 matches positions of the cutout 46 and the edge portion 38.

The same number of recessed portions 58, cutouts 46 and edge portions 38 as each other are provided at the same positions of the opposing sides, respectively. Therefore, it is possible to maintain the pressure plate 3a suitably horizontally at the time of pressing, and the arrangement pattern and the number of the recessed portions 58, the cutouts 46 and the edge portions 38 have no limitation.

Here, a pair of screw holes 59 are provided on a projecting portion 59a between the recessed portions 58. The screw holes 57 are provided in the thickness direction in the upper end plate 5 of the first embodiment, but the screw holes 59 are provided parallel to a plate surface in the upper end plate 5a of the present embodiment.

The lower end plate 6a differs in including the thick wall portion 68 from the lower end plate 6 of the first embodiment. A plurality of pairs of screw holes 69 are provided along the outer periphery of the thick wall portion 68 so as to correspond to the screw holes 59 of the upper end plate 5a. The screw holes 67 are provided in the thickness direction in the lower end plate 6 of the first embodiment, but the screw holes 69 are provided parallel to a plate surface in the lower end plate 6a of the present embodiment.

Next, a description will be given of the manufacturing method of the fuel cell stack 1a. In the following description, FIGS. 13 to 16 are referred to along with FIG. 4. In the manufacture of the fuel cell stack 1a, the fuel cell 2a, the pressure plate 3a, the shim plate 4a, the lower end plate 6a, the upper end plate 5a, the insulating plates 70 and 71, the fastening bars 80a and the like are prepared in advance. Here, also in the manufacturing method of the present embodiment, the manufacturing device 9 illustrated in FIG. 9 is used.

Figure 13:
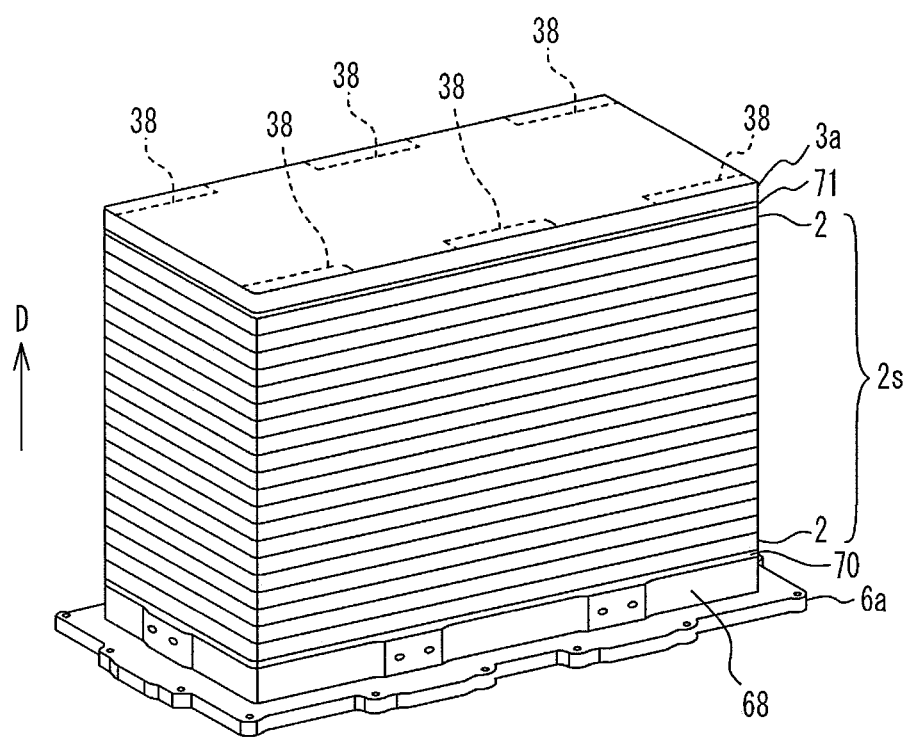
FIG. 13 is a perspective view illustrating another example of a step of stacking a cell stacked body and the pressure plate on the lower end plate.

FIG. 13 is a perspective view illustrating another example of a step of stacking the cell stacked body 2s and the pressure plate 3a on the lower end plate 6a. In FIG. 13, component parts identical to those of FIGS. 10 to 12 are designated by identical reference numerals, and a description thereof is omitted.

The lower end plate 6a is installed on the assembly table 97 (step SW. Next, the plurality of fuel cells 2 are stacked on the lower end plate 6a via the insulating plate 70 (step St2). Thereby, the cell stacked body 2s is arranged on the thick wall portion 68 of the lower end plate 6a.

Next, the pressure plate 3a is superposed on the cell stacked body 2s (step St3). Here, the shape of a plate surface of the pressure plate 3a is the same as that of the upper surface of the fuel cell 2. Next, the pressure plate 3a is pressed (step St4).

Figure 14:
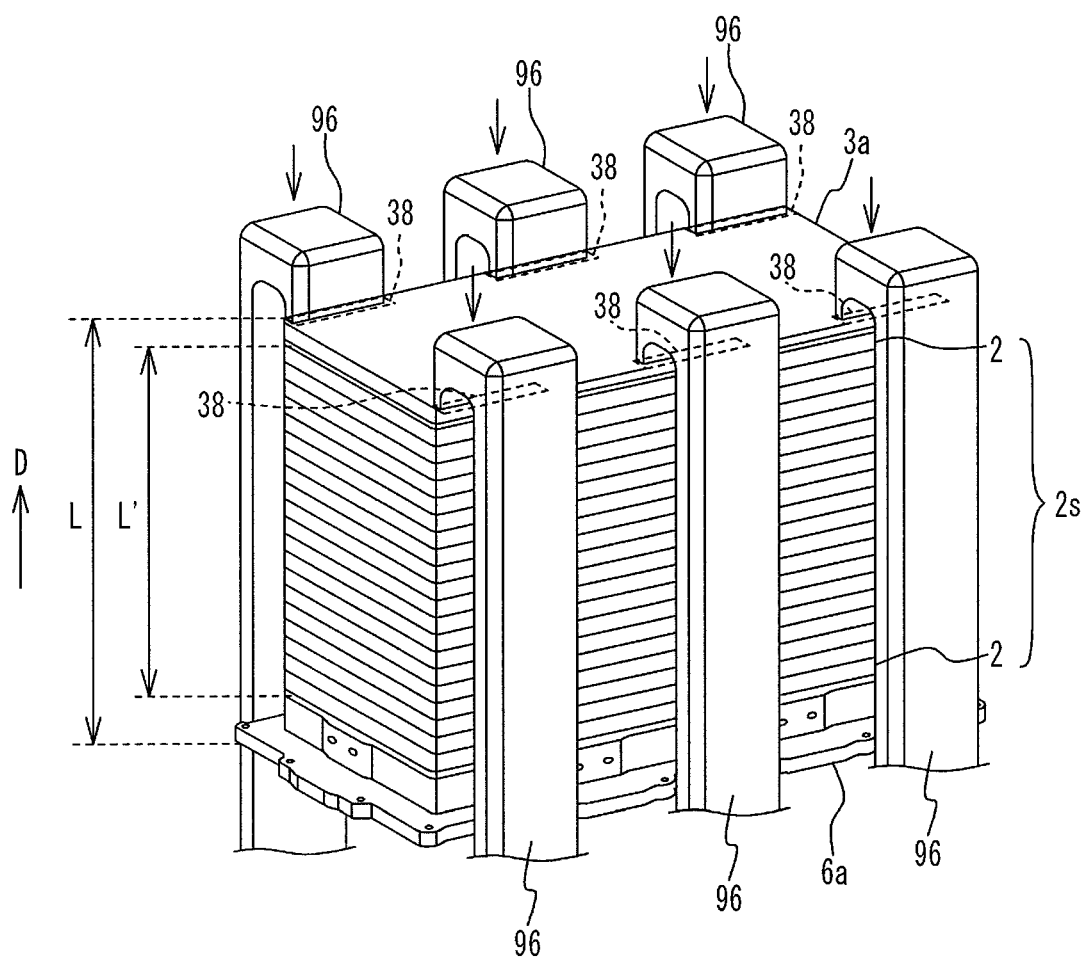
FIG. 14 is a perspective view illustrating an example of a step of pressing the pressure plate.

FIG. 14 is a perspective view illustrating an example of a step of pressing the pressure plate 3a. In FIG. 14, component parts identical to those of FIGS. 10 to 13 are designated by identical reference numerals, and a description thereof is omitted.

The pressure plate 3a is pressed downward, as indicated by arrows, by the plurality of arms 96. Thereby, the cell stacked body 2s is pressed between the lower end plate 6a and the pressure plate 3a.

In this case, since the whole plane of the pressure plate 3a is superposed on the cell stacked body 2s, the whole planar region of the pressure plate 3a can press the cell stacked body 2s. Then, since each arm 96 presses the edge portion 38, a region for superposing the shim plate 4a on an upper surface of the pressure plate 3a is ensured. That is, when the shim plate 4a is superposed on the pressure plate 3a from above, each arm 96 does not hinder the superposing.

More specifically, each arm 96 is engaged with the edge portion 38, and moves to a lower end plate 6a side along the stacking direction D to press the edge portion 38. A claw portion 96a provided at the tip of each arm 96 is engaged with the edge portion 38. Therefore, it is possible to press the pressure plate 3a from a lower side where the assembly table 97 is located.

Next, while each edge portion 38 is pressed, a stacking length L is measured (step St5). The stacking length L is a length from a lower end of the lower end plate 6a to an upper end of the pressure plate 3a. In this step, when each thickness of the lower end plate 6a and the pressure plate 3a is constant, a length L' of the cell stacked body 2s in the stacking direction D is calculated from the stacking length L, so that the length L' of the cell stacked body 2s can be measured.

Next, the shim plate 4a with a thickness corresponding to the measured stacking length L or the length L' of the cell stacking body 2s is selected from the plurality of shim plates 4a with respective different thicknesses (step St6). More specifically, the shim plate 4a with an appropriate thickness is selected so that the length of the fuel cell stack 1 in the stacking direction is a predetermined value. Thus, by preparing the plurality of shim plates 4a with respective different thicknesses in advance, it is possible to quickly prepare the shim plate 4a with the appropriate thickness. Next, the selected shim plate 4a is superposed on the pressure plate 3a (step St7).

Figure 15:
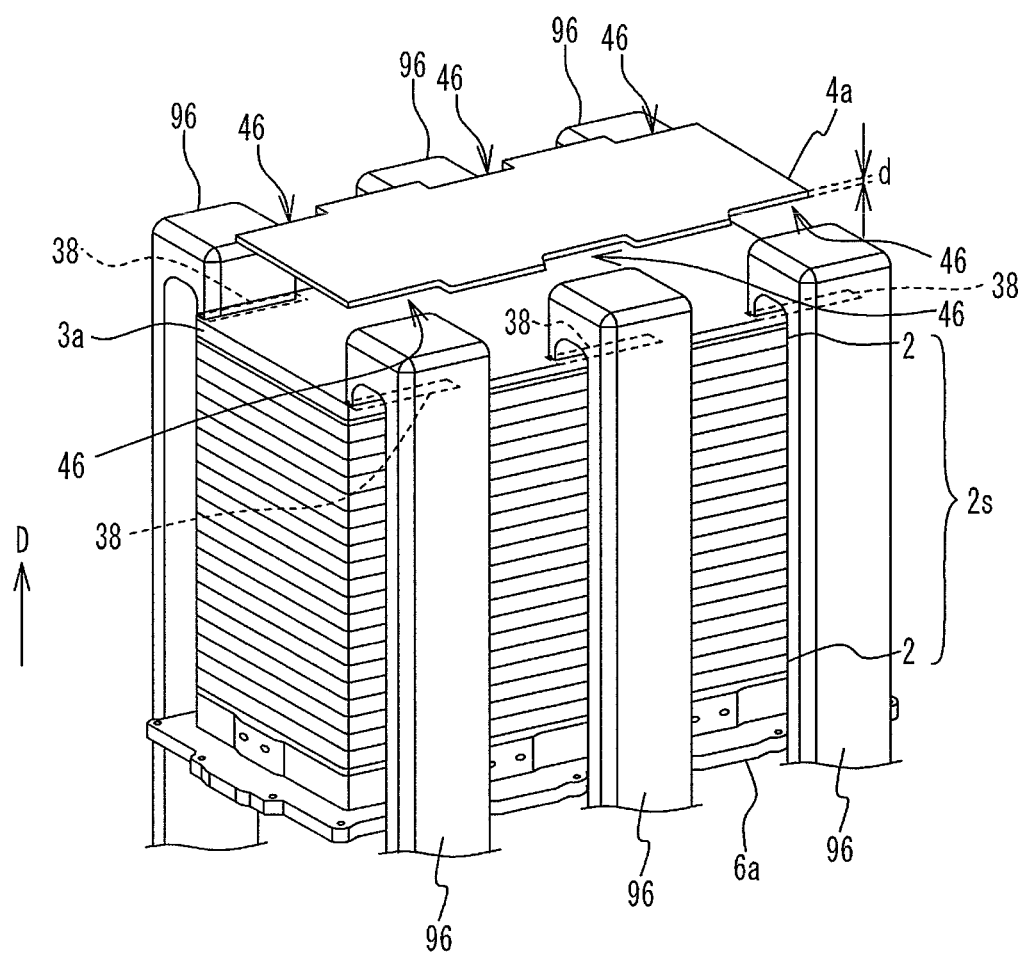
FIG. 15 is a perspective view illustrating an example of a step of superposing the shim plate on the pressure plate.

FIG. 15 is a perspective view illustrating an example of a step of superposing the shim plate 4a on the pressure plate 3a. In FIG. 15, component parts identical to those of FIGS. 10 to 14 are designated by identical reference numerals, and a description thereof is omitted.

This step is performed while each edge portion 38 is pressed. The shim plate 4a has a thickness d corresponding to the measured stacking length L or the length L' of the cell stacked body 2s in the stacking direction D. Therefore, variation in the length of the fuel cell stack 1 is reduced.

The shim plate 4a is superposed on the pressure plate 3a so that each cutout 46 matches the edge portion 38 of the pressure plate 3a. Thus, there is no hindrance in the arrangement of the shim plate 4a in the region of the pressure plate 3a on which the shim plate 4a is superposed. Therefore, while the pressure plate 3a is pressed, it is possible to superpose the shim plate 4a on the pressure plate 3a from above. Next, the upper end plate 5a is fixed to the lower end plate 6a (step St8).

Figure 16:
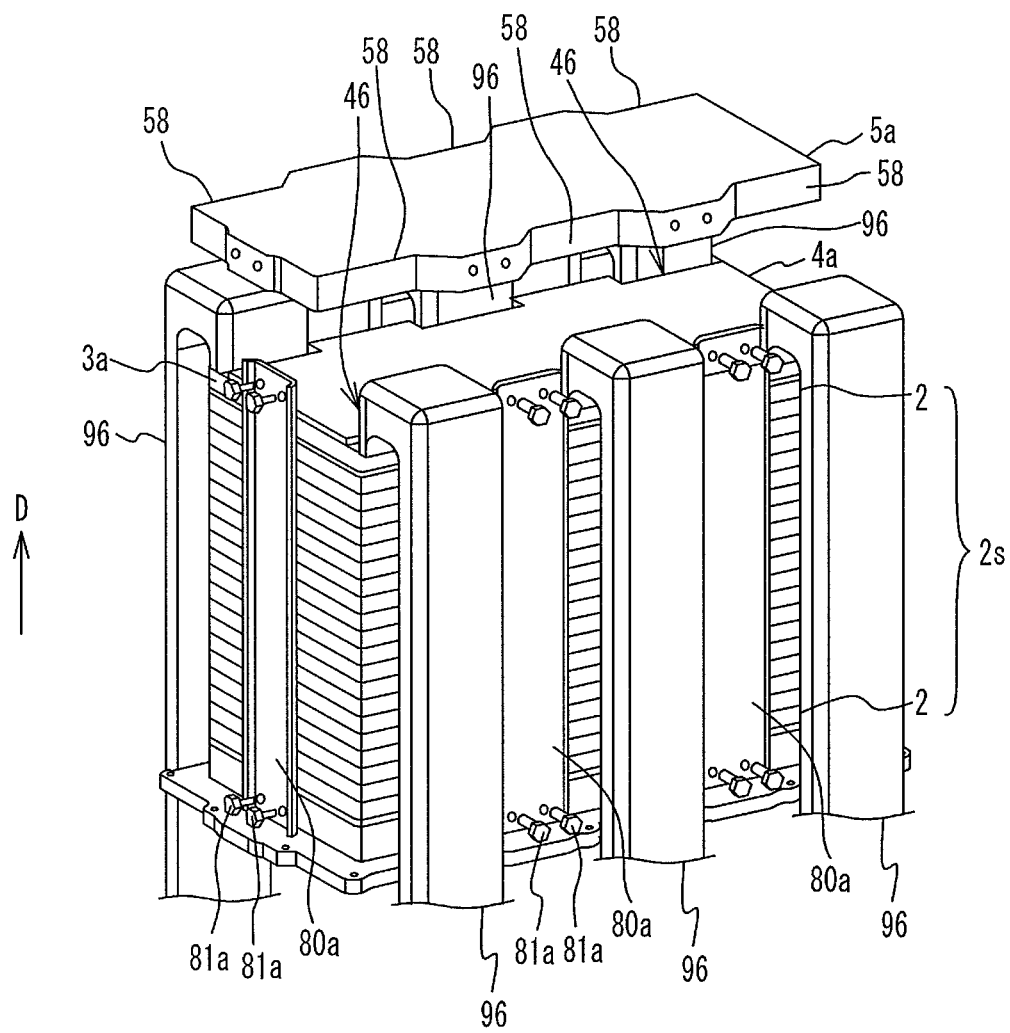
FIG. 16 is a perspective view illustrating an example of a step of fixing the upper end plate to the lower end plate.

FIG. 16 is a perspective view illustrating an example of a step of fixing the upper end plate 5a to the lower end plate 6a. In FIG. 16, component parts identical to those of FIGS. 10 to 15 are designated by identical reference numerals, and a description thereof is omitted.

This step is performed while each edge portion 38 is pressed. The upper end plate 5a is superposed on the shim plate 4a from above, and is fixed to the fastening bars 80a by being connected to them on the side faces of the upper end plate 5a by the bolts 81a. The lower end plate 6a is also fixed to the fastening bars 80a by being connected to them on the side faces of the thick wall portion 68 by the bolts 81a.

Thereby, the upper end plate 5a and the lower end plate 6a sandwich the cell stacked body 2s, the pressure plate 3a and the shim plate 4a. Here, the insulating plate 71 is arranged between the upper end plate 5a and the pressure plate 3a.

Moreover, the upper end plate 5a is superposed on the shim plate 4a so that each recessed portion 58 matches the cutout 46 of the shim plate 4a. Therefore, there is no hindrance in the arrangement of the upper end plate 5a in the region of the shim plate 4a on which the upper end plate 5a is superposed. Accordingly, while the pressure plate 3a is pressed, the upper end plate 5a can be superposed on the shim plate 4a from above.

When an outer peripheral shape of the upper end plate 5a is reduced to the extent that the upper end plate 5a does not interfere with the arm 96 without providing the recessed portions 58 on the upper end plate 5a unlike this embodiment, it is possible to superpose the upper end plate 5a on the shim plate 4a from above while the pressure plate 3a is pressed. However, when the upper end plate 5a is made small, there is a possibility that the upper end plate 5a does not sufficiently press the cell stacked body 2s due to the lack of rigidity. Therefore, the recessed portions 58 are provided on the upper end plate 5a as described above, which makes it possible to suppress a decrease in rigidity of the upper end plate 5a.

In this way, the manufacturing method of the fuel cell stack 1a is performed. In the manufacturing method of the present embodiment, the length L' of the cell stacked body 2s is measured while each edge portion 38 of the pressure plate 3a is pressed. Therefore, it is possible to measure the length L' of the cell stacked body 2s pressed between the lower end plate 6a and the pressure plate 3a, and the shim plate 4a with the appropriate thickness d in accordance with the length L' can be used.

Moreover, the step of superposing the shim plate 4a on the pressure plate 3a and the step of fixing the upper end plate 5a to the lower end plate 6a are performed while each edge portion 38 is pressed. When the shim plate 4a is superposed on the pressure plate 3a, each cutout 46 of the shim plate 4a matches the edge portion 38 of the pressure plate 3a, and therefore there is no hindrance in the case of superposing the shim plate 4a on the pressure plate 3a from above.

Moreover, when the upper end plate 5a is superposed on the shim plate 4a, each recessed portion 58 of the shim plate 4a matches the cutout 46 of the shim plate 4a, and therefore there is no hindrance in the case of superposing the upper end plate 5a on the shim plate 4a from above.

Therefore, according to the manufacturing method of the present embodiment, it is possible to arrange the shim plate 4a and the upper end plate 5a while the cell stacked body 2s is pressed, and further there is no need to fasten or release the upper end plate 5a in the middle of the manufacturing step, unlike the above-mentioned Patent Document 1. Thus, according to the manufacturing method of the present embodiment, the time required for the manufacture of the fuel cell stack 1a is shortened.

Although some embodiments of the present disclosure have been described in detail, the present disclosure is not limited to the specific embodiments but may be varied or changed within the scope of the present disclosure as claimed.

What is claimed is:

1. A manufacturing method of a fuel cell stack comprising:
   stacking a plurality of fuel cells on a first end plate;
   superposing a pressure plate, on which a plurality of protruding portions are provided along an outer periphery thereof, on a stacked body of the fuel cells so that the protruding portions protrude outward from side faces of the stacked body;
   engaging a plurality of arms with the protruding portions respectively so that a region inside the outer periphery on a surface of the pressure plate is ensured, the plurality of arms extending along a stacking direction of the plurality of fuel cells and facing the side faces of the stacked body;
   pressing the protruding portions towards the first end plate by moving the plurality of arms towards the first end plate so that the stacked body is pressed between the first end plate and the pressure plate;
   measuring a length of the stacked body in the stacking direction while continuing the pressing the protruding portions by moving the plurality of arms;
   superposing an adjustment plate on the region of the pressure plate while continuing the pressing the protruding portions by moving the plurality of arms, the adjustment plate having a thickness in accordance with the measured length of the stacked body; and
   fixing a second end plate to the first end plate so as to sandwich the stacked body, the pressure plate, and the adjustment plate between the first end plate and the second end plate while continuing the pressing the protruding portions by moving the plurality of arms.

2. The manufacturing method of the fuel cell stack as claimed in claim 1, wherein the fixing the second end plate to the first end plate includes:
   arranging each of a plurality of fixing members extending in the stacking direction between the protruding portions; and
   connecting the second end plate to the first end plate via the fixing members.

3. The manufacturing method of the fuel cell stack as claimed in claim 1, wherein the superposing the adjustment plate on the pressure plate includes:
   selecting the adjustment plate having the thickness in accordance with the measured length of the stacked body from a plurality of plates having respective different thicknesses; and
   superposing the selected adjustment plate on the region of the pressure plate.

4. A manufacturing method of a fuel cell stack comprising:
   stacking a plurality of fuel cells on a first end plate;
   superposing a pressure plate on a stacked body of the fuel cells;
   engaging a plurality of arms with a plurality of edge portions of the pressure plate respectively so that a region except for the plurality of edge portions on a surface of the pressure plate is ensured, the plurality of arms extending along a stacking direction of the plurality of fuel cells and facing side faces of the stacked body;
   pressing the plurality of edge portions of the pressure plate towards the first end plate by moving the plurality of arms towards the first end plate so that the stacked body is pressed between the first end plate and the pressure plate;
   measuring a length of the stacked body in the stacking direction while continuing the pressing the edge portions of the pressure plate by moving the plurality of arms;
   superposing an adjustment plate on the region of the pressure plate while continuing the pressing the edge portions of the pressure plate by moving the plurality of arms, the adjustment plate having a plurality of cutouts and a thickness in accordance with the measured length of the stacked body so that the cutouts match the edge portions, respectively; and
   fixing a second end plate to the first end plate so as to sandwich the stacked body, the pressure plate, and the adjustment plate between the first end plate and the second end plate while continuing the pressing the edge portions of the pressure plate by moving the plurality of arms.

5. The manufacturing method of the fuel cell stack as claimed in claim 4, wherein
   the fixing the second end plate to the first end plate includes superposing the second end plate on the adjustment plate so that a plurality of recessed portions provided along an outer periphery of the second end plate match the cutouts, respectively.

6. The manufacturing method of the fuel cell stack as claimed in claim 4, wherein the superposing the adjustment plate on the pressure plate includes:
   selecting the adjustment plate having the thickness in accordance with the measured length of the stacked body from a plurality of plates having respective different thicknesses; and
   superposing the selected adjustment plate on the region of the pressure plate.

* * * * *